June 17, 1969

J. M. GOODKIND ET AL 3,449,956

FORCE MEASURING INSTRUMENT

Filed Sept. 3, 1965

INVENTORS.
JOHN M. GOODKIND
WILLIAM A. PROTHERO

BY W. H. Maxwell

AGENT

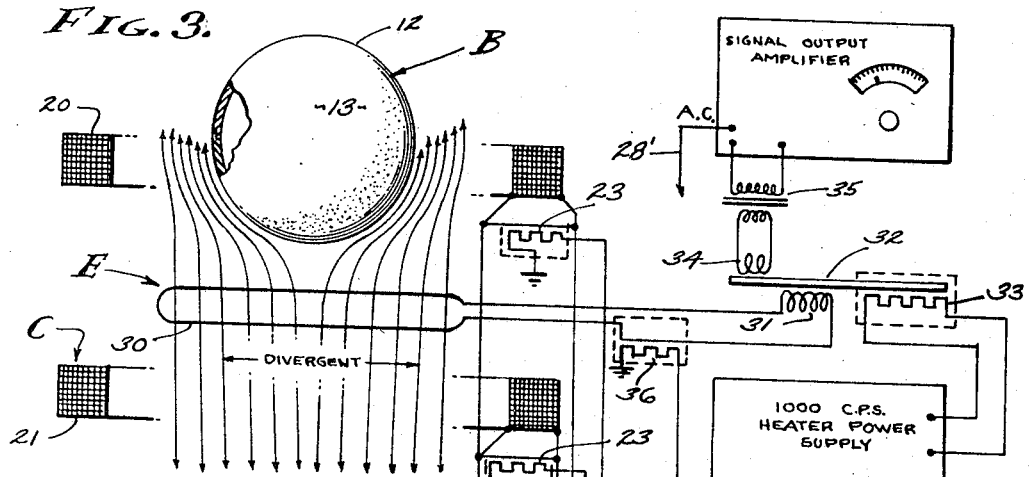

United States Patent Office 3,449,956
Patented June 17, 1969

3,449,956
FORCE MEASURING INSTRUMENT
John M. Goodkind, Solona Beach, Calif. (1535 Forest Way, Del Mar, Calif. 92014), and William A. Prothero, La Jolla, Calif. (730 Archer, San Diego, Calif. 92109)
Filed Sept. 3, 1965, Ser. No. 484,989
Int. Cl. G01m *1/12;* G01p *15/00*
U.S. Cl. 73—382
12 Claims

ABSTRACT OF THE DISCLOSURE

This invention relates broadly to a geophysical device that detects accelerations, movements, and/or displacements of a suspended mass and employs the phenomenon of superconductive persistent current for the suspension of the mass and accurately detects its movements which result from gravitational, or inertial forces. This invention provides a practical, stable and precise instrument for measuring gravitational forces and as well accelerations along other than vertical axes when and if so desired, through the magnetic support of the mass upon a low angle spring slope, and by disposition of an associated detection means along the axis to be detected.

---

Generally, this invention involves a mass supported by relatively weak spring means associated with means to position the mass and with means to detect the position of the mass and with means to detect movement of the mass. Heretofore, devices of the type under consideration have been subject to drift and inaccuracies, and they have not been suitable for detection over long periods of time. Furthermore, such devices have been complex and expensive and require extreme mechanical precision. For example, mechanical spring supports are subject to drift, both the usual electrical and optical methods of measurement are subject to drift, and all structural mechanisms such as those usually employed are plagued with discrepancies which enter therein as a result of applied loads, time deterioration and temperature variations, etc.

An object of this invention is to provide an improved yet simple instrument for the measurement of gravity and like forces, wherein the instrument structure is stable and not subject to drift, whereby measurement of force on a mass due to the pull of gravitation can be conducted over long periods of time and thereby detecting small changes which, for example, occur due to geophysical phenomenon and the like.

It is an object of this invention to provide spring means for the suspension of a mass, its movements to be detected, and which is characterized by its soft and weak nature, cooperatively associated with supporting and centering characteristics that vertically (also laterally) position the mass. As will be later described, the spring "slope" of low angle is advantageously employed to the end that the mass is supported against the pull of gravity at selected positions and from which positions it is measurably movable with extreme accuracy of detection.

It is another object of this invention to provide a precise detection means for determining the movements of a mass suspended as above referred to and advantageously related to the low angle of slope, whereby large displacements of the mass are sensed as a result of small changes in gravitational force.

It is still another object of this invention to provide means for placement of a mass, to be suspended as above referred to by means of a sensitive spring, thereby to maintain placement of the mass supported on the spring. As will be later described, electrostatic force on the mass is related to capacitance along a plurality of axes and to the end that the mass is movable along said axes by the application of electrostatic potentials to capacitor plates, as will be described.

It is still another object of this invention to advantageously employ the phenomenon inherent with superconductivity in materials, by providing means to support superconductivity in a mass supporting and mass positioning and mass movement detecting device, all as hereinabove referred to.

The various objects and features of this invention will be fully understood from the following detailed description of the typical preferred form and application thereof, throughout which description reference is made to the accompanying drawings, in which:

FIG. 3 is the schematic and block diagram showing the electrical arrangements involved.

FIG. 4 is a graphic illustration of the spring slope that is provided.

FIG. 5 is a schematic and block diagram showing the placement means that is provided.

Figure 1:
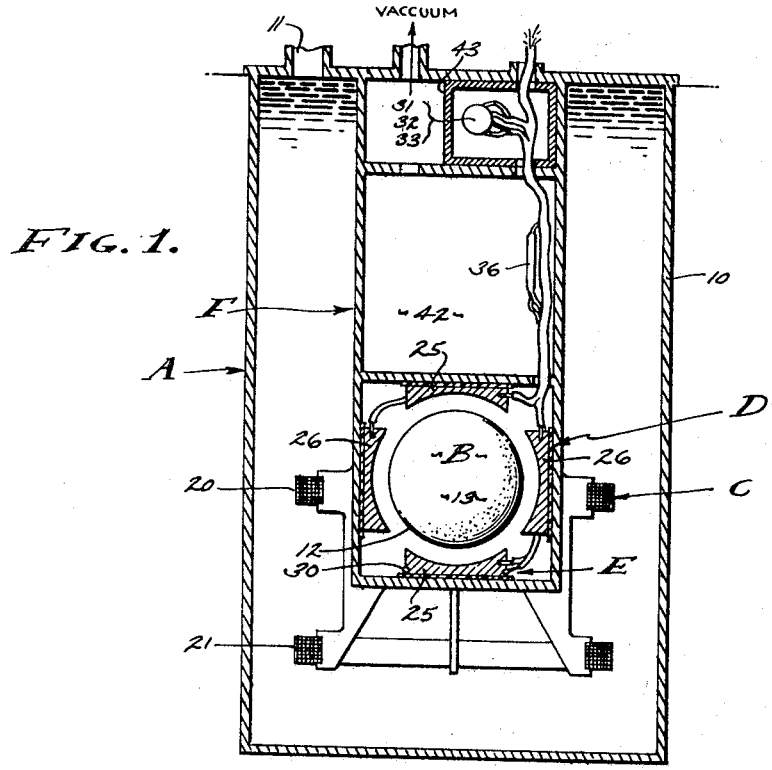
FIG. 1 is a sectional view showing generally a typical embodiment of the present invention.
Figure 2:
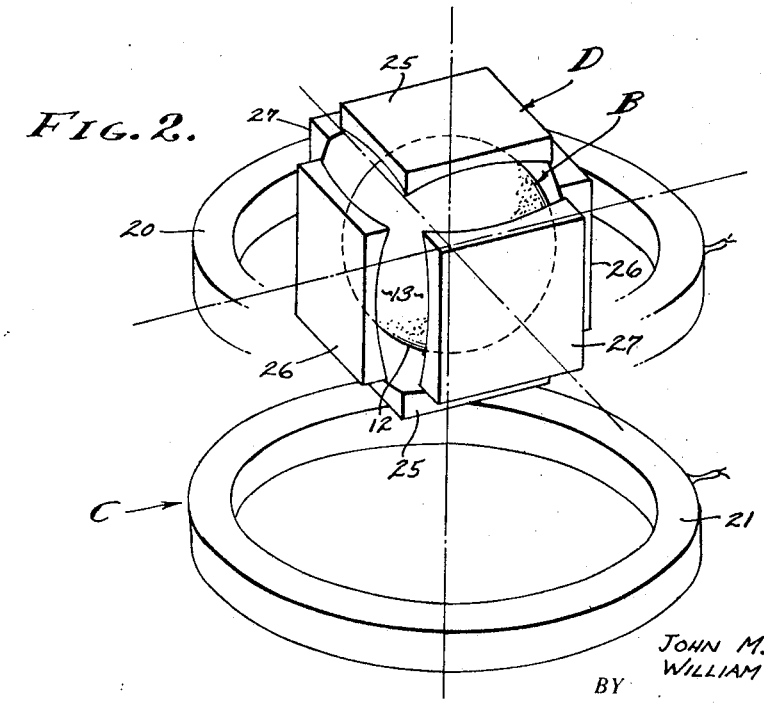
FIG. 2 is a perspective view showing the characteristic elements and relationship thereof.

The gravity measuring instrument of the present invention detects very small accelerations and/or changes in gravitational force. The instrument employs the properties of superconducting metals in various ways, such that sensitivity and stability over long periods of time are far greater than the sensitivity and stability experienced with prior art devices designed for the same purpose. Therefore, a general understanding of the physics surrounding superconductivity is necessary in understanding the present invention, as follows:

All metals at normal temperatures exhibit some resistance to the flow of electricity, and pure metals such as copper or aluminum show very little resistance and therefore very little heating with the flow of current, while alloys such as are used for electrical heaters have a high resistance. However, some metals are called superconductors and at a certain critical temperature suddenly lose all resistance to the flow of electricity. Some hundreds of metals have been shown to exhibit this property and their critical temperatures range between approximately .01° Kelvin and 18.5° Kelvin (zero degrees Kelvin equals −273° centigrade). Thus the critical temperatures involved are very low but are easily reached, for example, by immersion in liquid helium or its vapors. Now, if current is caused to flow around a closed loop of superconductor at or below its critical temperature, the complete lack of resistance causes the current to continue to flow indefinitely as long as the metal is kept at or below its critical temperature. In this way the magnetic flux generated by current flow around the loop of superconductor will remain constant. The stability of this magnetic flux is advantageously employed to create the stability and precision of the gravity measuring instrument hereinafter described.

Thus, if a magnetic field is imposed on a loop of superconductor at or below critical temperature from a separate external magnet, a current will flow in the loop so as to generate a magnetic flux that exactly cancels the change imposed by said external magnet. In addition, there is a field exclusion effect in bulk superconductors, called the Meissner effect after its discoverer; that in a solid body of superconductor at or below its critical temperature, all magnetic fields are excluded from its interior as long as the fields at its surface are less than a critical value. The critical value of these fields ranges from a few gauss up to many thousands of gauss for presently known superconductors.

The gravity measuring instrument that we provide does not necessarily require extreme precision in its manufacture and is yet extremely accurate due to the inherent constancy of phenomenon surrounding the use of superconductors. However, it is required that the said superconductors be subjected to an environment that establishes the absence of resistance therein, namely a temperature environment at or below a critical temperature of for example 18° Kelvin when employing niobium zirconium conductors. The functional requirements are but few and involve, generally, a cold maintaining means A, a mass B, a support means C for suspension of the mass, a mass placement means D, and a detection means E, and a container F to house the elements B, D and E. The elements A through F are combined in a single device to work cooperatively toward the detection of changes in gravitational pull, and especially of changes of small magnitude spread over long time durations. Hence, it is important that the support means C be constant and not subject to decay and that the force detection means E be operatively constant and not subject to drift. It is to these ends, therefore, that an environment is established by a cold maintaining means A to support superconductivity in conductors selected especially for their ability to conduct virtually without resistance when subjected to known critical or less than critical temperatures.

The idea of means involves the magnetic support of a mass, and which avoids the use of mechanical and other forms of spring means. More specifically, we provide a stable current in a superconducting coil, in such a way as to establish a sensitive spring support for a mass which too is superconductive, and all of which is cooperatively related to a supersensitive detection means E that advantageously employs the physical benefits of superconductivity. To this end, the cold maintaining means A is provided so as to refrigerate the elements B through E and so that they remain superconductive. For example, and as is presently practiced, the temperature environment maintained by the means A is about 3.5° Kelvin and up to .4.2° Kelvin and which is readily maintained substantially without variation by immersion in liquid helium or vapors thereof. To this end, therefore, we employ a surrounding housing 10 in the form of a magnetically shielded vessel, a Dewar flask, for the containment of liquid helium, or the like, and which is filled with the cold liquid as is clearly indicated. A suitable fill and/or pump-out tube 11 is provided to control the supply of refrigerating fluid. It is to be understood, of course, that any other suitable means can be employed for lowering the interior temperature of the housing 10 and maintaining it at the temperature required.

The mass B is the element whose suspension, placement, and detection is required. The mass B is to be suspended by floating in or upon a magnetic field, and though it can be especially shaped a spherical shape is used. Therefore, we have shown the means B in the form that has been actually reduced to practice, a substantially true sphere or ball 12. It is to be observed that imperfections (within reasonable limitations) in the ball contour do not adversely affect the precision of the instrument, since a superconductor of any shape will levitate in a magnetic field. In carrying out the invention, the mass B is a sphere of one inch diameter, made of aluminum having a .025 inch wall thickness, and coated with an uninterrupted layer 13 of superconductive material such as lead .001 inch thick. Again, imperfection or variation in the wall thickness of the mass is not critical, nor is the perfectness of the superconductive coating. However, reasonable uniformity is to be desired. The mass B is to levitate freely within the instrument means C and D and it need not be evacuated, but must contain helium gas or the like, as others solidify in the low temperature environment. In practice, the mass B weighs 3 grams. The lead coating 13 is the superconductor presently employed and which is applied to the wall B to coact with the magnetic field which will next be described.

The support means C is the suspension element of the instrument and lifts the mass B to be suspended free in space within the confinement of the mass placement means D. In accordance with the invention, and the characteristic feature thereof, the support means C is a magnetic flux generating means which generates a flux pattern such as to produce a force on mass B as is depicted graphically in FIG. 4, $f$ representing the supporting force and $d$ representing distance. It will be observed from FIG. 3 that there is a cone shaped formation of flux lines formed around the mass B as a result of the field exclusion effect. It is the compression and divergence of the flux lines contributed to by the field exclusion effect which leads to the levitating force on mass B. In practice, the mass B floats free at the magnetic flux generating means, and the latter comprises a pair of circular coils of about 2½ inch mean diameter and of about ¼ inch square cross sectional area. The uppermost coil 20 is at a plane which passes through the mass B, when said mass is suspended, and the lowermost coil 21 is at a plane spaced downward from the first mentioned coil approximately one half the diameter thereof. The coils 20 and 21 can be alike or identical, though they are powered differently, being composed of 400 turns of .010 inch diameter niobium zirconium wire conductor, a superconductor in the environment above specified.

A sensitive spring is made by using the above described arrangement of superconducting current coils 20 and 21. Our arrangement consists of the two circular coils separated by a distance about equal to their radius. The mass B is supported just above the center of the top coil and in this manner, for example .1 inch above, the mass B acts as if it were supported by a very weak spring. Due to the configuration of the magnetic field a small change in force produces a large displacement of the mass B. The coils carry independent currents and are energized from separate selectively variable power supplies. By adjusting the currents from the power supplies, a greater current to the lowermost coil 21, a force sufficient to suspend the ball is created even though the variation of this force with respect to vertical position is very small.

In order to trap a field in either superconducting coil 20 or 21, the leads of the coils are brought to a variable current D.C. power supply 22 as shown in FIG. 3. The coil 20–21 is within the low temperature environment and a heater 23 is used to drive a small section of the coil circuit above the critical temperature. Then the current from the D.C. power supply 22 is turned on, in which case all of the current will flow through the main coil 20–21, because it has zero resistance. At the desired current, the heater 23 is turned off so that the small section of the coil circuit returns to its superconducting state, whereby the field produced by the D.C. current is trapped and the power supply 22 can be disconnected and is removed from service.

The mass placement means D is provided primarily for maintaining position of the mass B and comprises six plates arranged symmetrically in three opposed pairs 25, 26 and 27 disposed on three intersecting axes normally related and extended through the center of the mass. The plates are alike and preferably identical, each being concaved and faced toward the side surface of the mass B. As shown, the faces of the plates 25, 26 and 27 are semi-spherical and on a center coincidental with the center of the spherical mass B, when the mass is centered. By electrically connecting two pairs of plates, for example plates 26 and 27, on axes disposed on a common plane a ring is formed that surrounds the mass B, and the electrical capacitance between this ring of plates and the two remaining plates can be employed to apply force to the mass, as well as to measure its placement. This capacitance will depend upon the distance between the mass B and the plates. This ring formation can be selectively formed in any one of three planes, vertical or two normally related horizontal axes, and therefore, the position of the mass B can be determined along said three separate axes. In practice, a reasonably close displacement can be observed in this way.

In order to employ the plates 25, 26 and 27 for the purpose of determining the position of the mass B along the vertical axis of the ring, the plates 26 and 27 are connected to form the above described ring, and the capacitance between the top plate 25 and ring and bottom plate 25 and ring are compared in a capacitance bridge network (not shown).

The capacitance of the plates is employed to eliminate nonlinearity in the device. That is, due to the way the magnetic force on the mass B changes when the mass moves, the position of the mass will not be strictly proportional to the gravitational force applied. Furthermore, the detection herein disclosed is not strictly linear. Therefore, voltages are applied to the ring at two opposed plates so as to apply an electrostatic force to the mass B. The voltage applied is proportional to the signal from the field detecting loop 30 or from the above mentioned capacitance bridge network, so that the system feedback acts so as to keep the mass B in substantially the same position at all times. This is done by controlling a D.C. amplifier 28 from the singal output amplifier (FIGS. 3 and 5) through a line 28' and A.C. to D.C. converter 29. Schematically the force is applied as follows: the four plates 26 and 27 in the horizontal plane (the two horizontal axes) are connected together to form the ring. The top and bottom plates 25 on the vertical axis are put at constant voltages $\pm Vo$. The mass B is placed and/or centered by amplifying the signal from the detector loop 30 to be later described, changing it to a D.C. voltage and then putting that voltage (negative feedback) on the center ring of plates 26–27 such that it forces the mass B to remain substantially at its original placement. Thus, the force necessary to return the mass B to its original placement is measurable as a voltage.

The detecting means E employs a super-conductive detection loop 30 in the above described field that suspends the mass B. The loop 30 is fixedly positioned immediately below the mass B and is disposed in a horizontal plane, and is concentric with the axis of the coils 20 and 21. The detection loop 30 is of superconducting wire of niobium and is part of a circuit that extends outside of the supporting field as shown. Thus, a change in the position of the mass B will try to move magnetic flux through the loop 30. This will cause a current to flow in the loop and which will continue to flow so long as the mass B remains in its new position, since the wire is superconducting. This current creates a magnetic field in a primary winding 31 and this field is measured by a suitably sensitive means, a means that converts the field to an alternating voltage by means of a superconducting body or core 32 positioned within the winding 31. The core 32 is cyclically heated and cooled by means of an alternating current through heater 33 (at 1,000 c.p.s.) such that it passes back and forth between normal and superconducting states. A heater power supply drives the heater. In the superconducting state, the Meissner effect above described, excludes the field from the core and therefore from the winding 31 which encircles the core. In the normal state, however, a field is present. A secondary winding 34 encircling the primary winding is provided and sees a magnetic field turning on and off as the body 32 operates between normal and superconducting states. This induces an alternating voltage in the winding 34, the sensor from which a useable signal is put through a step-up transformer 35 and is amplified. The detecting means hereinabove described is extremely sensitive and is capable of measuring fields as small as $2 \times 10^{-4}$ gauss and such as to measure a field as close as possible to zero or null. The loop 30 and laterally extended circuit thereof is put into operation with the aid of a heater 36 that disrupts the continuity of the superconductor in order to eliminate undesirable currents that might otherwise prevail as a result of initating operation.

The container F is provided to house the elements B, D and E to subject them to the low temperature environment, by the means A, to permit the mass B to be affected by the field of the support means C, and to additionally provide an adequate thermal transfer and yet insignificant bouyant force on the mass B. To these various ends the container F is a closed container that is evacuated to a pressure of 1 mm. of mercury. The container has a chamber 42 wherein the primary and secondary windings 31 and 34, core 32 and its heater 33 are encased in a magnetic shield 43 of lead. The container F is made, for example of copper which is not a superconductor at the temperature environment within which the container is supported, and which transmits heat to and from its interior and permits the flux from the coils 20 and 21 to penetrate therethrough for affecting the position and movement of the mass B.

From the foregoing it will be seen that the gravity measuring instrument consists of electromagnets wound of superconducting wire so as to generate a stable magnetic field. In this magnetic field a superconducting mass is floated. As the mass is brought near the field, and therefore into regions of more dense flux, currents will flow on its surface due to the exclusion effect. Thus, the mass generates its own counter magnetic field and there will be a force exerted between the mass and the supporting field. The said force is in a direction which tends to push the mass out of the supporting magnetic field, and this pushing force will vary with the placement of the mass relative to said field. Consequently, with the upwardly divergent configuration of the field, as above described, there will be a position at which the repulsive force is in equilibrium with the gravitational force on the mass B, and the mass will float. Essentially, the mass B is suspended by a magnetic spring, the support means C, and when the mass is depressed the magnetic force in the means C tends to oppose the depression. On the contrary, if the mass is lifted, then the magnetic force applied decreases. Furthermore, when the force of gravity changes, the equilibrium position of the mass B will change, floating higher for small gravitational force and floating lower for larger gravitational force. Therefore, accurate measurement and detection of the position of the sphere will measure the force of gravity applied to the sphere. High sensitivity to minute charges in the force of gravity is achieved by the provision of the appropriate field configuration described, so that a very small change in gravity will move the mass B a relatively large distance and which is accurately measured. The advantages of superconductivity are employed in the detection means E wherein the second winding 34 is the sensor which provides a signal of extreme accuracy and which can be amplified for use as circumstances require. The winding 31 provides a magnetic field which is initially zero but which will be finite in one direction or the other when the mass moves in a complementary direction from its initial position. In practice, the field through winding 31 is maintained at zero by means of a feedback winding around winding 31 (not shown) and in this way no current will flow in loop E so that the detection circuit does not create magnetic fields that would alter the supporting force.

The mass placement means D involves the use of the capacitance bridge and employs plates that can be used to center the mass B and also to align the axis of the coil 20–21 vertically. Furthermore, by the simultaneous use of this capacitance bridge as a position detector and the detection means D hereinabove described, any variations that could occur in the magnetic "spring" results in a difference in the signals obtained from said detection means D and capacitance bridge, a self-checking idea of means. As hereinabove described, there are six capacitor plates and these are employed by connecting four of the same in parallel and by measuring the capacitance between said four plates and the two remaining and opposed normally related plates. As above described the mass B can be forced to move by the application of voltage to the plates 25, 26 and 27 and the mass B can also be located. By connecting another four plates in parallel the two remaining of the three available axes of mass movement are available for measurement as circumstances require. For example, when the mass B is centered vertically, the capacitance between the upper plate 25 and the ring of plates 26–27 equals the capacitance between said ring of plates and the lower plate 25, and in this case horizontal and/or transverse motions are not made or sensed.

Having described only a typical preferred form and application of our invention, we do not wish to be limited or restricted to the specific details herein set forth, but wish to reserve to ourselves any modifications or variations that may appear to those skilled in the art.

We claim:

1. A force measuring instrument of the character described including:
   (a) a superconducting mass to be suspended in place for detection of force applied thereto;
   (b) a yielding support for levitating the mass and comprising a vertically disposed magnetic field centered therewith, said mass being placed by the field and suspended therein;
   (c) a cold maintaining means associated with the superconducting mass for its field exclusion effect thereon;
   (d) and a mass placement means comprising three pairs of opposed capacitor plates, arranged on one vertical and two horizontal normally related and intersecting axes respectively, surrounding the mass in equally spaced opposition to the surface of the mass when it is centered, and said plates on the horizontal axes being joined in a ring with means responsive to position of the mass on said vertical axis to charge said plates on the horizontal axes with feedback voltage to apply a force to maintain placement of the mass, and the two remaining and opposed vertical pair of plates being put at constant plus and minus voltages to maintain placement of the mass, and the two remaining and opposed vertical pair of plates being charged with alternating voltage means to be sensed for vertical placement of the mass.

2. A force measuring instrument of the character described including:
   (a) a superconducting mass to be suspended in place for detection of force applied thereto;
   (b) a yielding support for levitating the mass and comprising a vertically disposed magnetic field established by a plurality of vertically aligned like and superconducting coils, the lower coils being energized by the flow of current to be magnetically stronger than the upper coils, whereby a low angle spring slope is obtained;
   (c) a cold maintaining means associated with the superconducting mass for its field exclusion effect thereon, and with the superconducting coils to subject them to a temperature supporting superconductivity therein;
   (d) and a detection means indicating movement of the mass in the field.

3. A force measuring instrument of the character described including:
   (a) a superconducting mass to be suspended in place for detection of force applied thereto;
   (b) a yielding support for levitating the mass and comprising a vertically disposed and upwardly divergent magnetic field established by a pair of upper and lower vertically aligned superconducting coils of larger diameter than the mass and spaced about half their diameter apart, the lower coil being energized by the flow of current to be magnetically stronger than the uper coil, whereby a low angle spring slope is obtained;
   (c) a cold maintaining means associated with the superconducting mass for its field exclusion effect thereon, and with the superconducting coils to subject them to a temperature supporting superconductivity therein;
   (d) and a detection means indicating movement of the mass in the field.

4. A force measuring instrument of the character described including:
   (a) a superconducting mass to be suspended in place for detection of force applied thereto;
   (b) a yielding support for levitating the mass and comprising a vertically disposed magnetic field established by a plurality of vertically aligned like and superconducting coils, the lower coils being energized by the flow of current to be magnetically stronger than the upper coils, whereby a low angle spring slope is obtained;
   (c) a cold maintaining means associated with the superconducting mass for is field exclusion effect thereon, and with the superconducting coils to subject them to a temperature supporting superconductivity therein;
   (d) and a mass placement means comprising capacitor plates surrounding the mass and opposed to its surface, to be charged with voltage for effecting movement of the mass, and to be connected in a capacitance bridge network for discerning position of the mass.

5. A force measuring instrument of the character described including:
   (a) a superconducting mass to be suspended in place for detection of force applied thereto;
   (b) a yielding support for levitating the mass and comprising a vertically disposed magnetic field established by a plurality of vertically aligned like and superconducting coils, the lower coils being energized by the flow of current to be magnetically stronger than the upper coils, whereby a low angle spring slope is obtained;
   (c) a cold maintaining means associated with the superconducting mass for its field exclusion effect thereon, and with the superconducting coils to subject them to a temperature supporting superconductivity therein;
   (d) and a mass placement means comprising three pairs of opposed capacitor plates arranged on three normally related and intersecting axes, surrounding the mass in equally spaced opposition to its surface when the mass is centered, and said plates in one plane being electrically joined in a ring and a capacitance bridge network being connected to the plates separately comparing the two remaining and opposed plates to the ring of plates, for discerning position of the mass.

6. A force measuring instrument of the character described including:
   (a) a superconducting mass to be suspended in place for detection of force applied thereto;
   (b) a yielding support for levitating the mass and comprising a vertically disposed magnetic field established by a plurality of vertically aligned like and superconducting coils, the lower coils being energized by the flow of current to be magnetically stronger than the upper coils locating the mass at the uppermost coils, whereby a low angle spring slope is obtained;
   (c) a cold maintaining means associated with the superconducting mass for its field exclusion effect thereon, and with the superconducting coils to subject them to a temperature supporting superconductivity therein;
   (d) and a mass placement means comprising three pairs of opposed capacitor plates, arranged on one vertical and two horizontal normally related and intersecting axes respectively, surrounding the mass in equally spaced opposition to the surface of the mass when it is centered, and said plates on the horizontal axes being joined in a ring with means responsive to position of the mass on said vertical axis to charge said plates on the horizontal axes with feedback voltage to apply a force to maintain placement of the mass, and the two remaining and opposed vertical pair of plates being put at constant plus and minus voltages to maintain placement of the mass, and the two remaining and opposed vertical pair of plates being charged with alternating voltage means to be sensed for vertical placement of the mass.

7. A force measuring instrument of the character described including:
 (a) a superconducting mass to be suspended in place for detection of force applied thereto;
 (b) a yielding support for levitating the mass and comprising a vertically disposed magnetic field established by a plurality of vertically aligned like and superconducting coils, the lower coils being energized by the flow of current to be magnetically stronger than the upper coils, whereby a low angle spring slope is obtained;
 (c) a detection means indicating movement of the mass and comprising, a superconducting induction loop in the magnetic field for generating current upon movement of the mass which causes a corresponding movement of flux lines in the field;
 (d) and a cold maintaining means associated with the superconducting mass for its field exclusion effect thereon, and with the superconducting coils and superconducting induction loop to subject them to a temperature supporting superconductivity therein.

8. A force measuring instrument of the character described including:
 (a) a superconducting mass to be suspended in place for detection of force applied thereto;
 (b) a yielding support for levitating the mass and comprising a vertically disposed magnetic field established by superconducting coils therefor, said mass being placed by the field and suspended therein;
 (c) and a mass placement means comprising three pairs of opposed capacitor plates arranged on three normally related and intersecting axes, surrounding the mass in equally spaced opposition to its surface when the mass is centered, and said plates in one plane being joined in a ring and variably charged with zero voltage and the two remaining and opposed plates being oppositely biased by fixed voltage of opposite polarity for effecting movement of the mass;
 (d) a detection means indicating movement of the mass and comprising, a superconducting induction loop in the magnetic field for generating current upon movement of the mass which causes a corresponding movement of flux lines in the field, and a signal amplifier having an input connected to said induction loop and a feedback controlling D.C. voltage to the above said plates of the placement means to restrain movement of the mass;
 (e) and a cold maintaining means associated with the superconducting mass for its field exclusion effect thereon, and with the superconducting coils and superconducting induction loop to subject them to a temperature supporting superconductivity therein.

9. A force measuring instrument of the character described including:
 (a) a superconducting mass to be suspended in place for detection of force applied thereto;
 (b) a yielding support for levitating the mass and comprising a vertically disposed magnetic field established by a plurality of vertically aligned like and superconducting coils, the lower coils being energized by the flow of current to be magnetically stronger than the upper coils, whereby a low angle spring slope is obtained;
 (c) a detection means indicating movement of the mass and comprising, a superconducting induction loop in the magnetic field for generating current upon movement of the mass which causes a corresponding movement of flux lines in the field, there being a laterally extended and closed circuit from the induction loop with a primary winding wrapped upon a superconducting core and with a secondary winding of superconductor, and means cyclically heating the said core whereby the secondary winding sees the alternate penetration of a field through said core;
 (d) and a cold maintaining means associated with the superconducting mass for its field exclusion effect thereon, and with the superconducting coils and superconducting induction loop to subject them to a temperature supporting superconductivity therein.

10. A force measuring instrument of the character described including:
 (a) a superconducting mass to be suspended in place for detection of force applied thereto;
 (b) a yielding support for levitating the mass and comprising a vertically disposed magnetic field established by superconducting coils therefor, said mass being placed by the field and suspended therein;
 (c) and a mass placement means comprising three pairs of opposed capacitor plates arranged on three normally related and intersecting axes, surrounding the mass in equally spaced opposition to its surface when the mass is centered, and said plates in one plane being joined in a ring and variably charged with zero voltage and the two remaining and opposed plates being oppositely biased by fixed voltage of opposite polarity for effecting movement of the mass;
 (d) a detection means indicating movement of the mass and comprising, a superconducting induction loop in the magnetic field for generating current upon movement of the mass which causes a corresponding movement of flux lines in the field, there being a laterally extended and closed circuit from the induction loop with a primary winding wrapped upon a superconducting core and with a secondary winding of superconductor, and means cyclically heating the said core whereby the secondary winding sees the alternate penetration of a field through said core, and a signal amplifier having an input connected to said secondary winding and a feedback controlling D.C. voltage to the above said plates of the placement means to restrain movement of the mass;
 (e) and a cold maintaining means associated with the superconducting mass for its field exclusion effect thereon, and with the superconducting coils and superconducting induction loop to subject them to a temperature supporting superconductivity therein.

11. A force measuring instrument of the character described including:
 (a) a superconducting mass contained in a partial vacuum and to be suspended in place for detection of force applied thereto;
 (b) a yielding support for levitating the mass and comprising a vertically disposed magnetic field established by a plurality of vertically aligned like and superconducting coils, the lower coils being energized by the flow of current to be magnetically stronger than the upper coils, whereby a low angle spring slope is obtained;
 (c) a cold maintaining means associated with the superconducting mass for its field exclusion effect thereon and with the superconducting coils to subject them to a temperature supporting superconductivity therein;
 (d) and a detection means indicating movement of the mass in the field.

12. A force measuring instrument of the character described including:
(a) a spherical superconducting mass comprising a hollow aluminum ball enclosed in a lead coating to be suspended in place for detection of force applied thereto;
(b) a yielding support for levitating the mass and comprising a vertically disposed magnetic field established by superconducting coils of niobium zirconium therefor, said mass being placed by the field and suspended therein and with means to trap adjustably selected current in said coils;
(c) and a mass placement means comprising three pairs of opposed capacitor plates arranged on three normally related and intersecting axes, surrounding the mass in equally spaced opposition to its surface when the mass is centered, and said plates in one plane being joined in a ring and variably charged with zero voltage and the two remaining and opposed plates being oppositely biased by fixed voltage of opposite polarity for effecting movement of the mass;
(d) a detection means indicating movement of the mass and comprising, a superconducting induction loop of niobium in the magnetic field for generating current upon movement of the mass which causes a corresponding movement of flux lines in the field, there being a laterally extended and closed circuit from the induction loop with a primary winding wrapped upon a superconducting core of niobium zirconium and with a secondary winding of superconductor niobium zirconium, and means cyclically heating the said core whereby the secondary winding sees the alternate penetration of a field through said core, and a signal amplifier having an input connected to said secondary winding and a feedback controlling D.C. voltage to the above said plates of the placement means to restrain movement of the mass;
(e) a cold maintaining means comprising a vessel of helium with the superconducting mass, superconducting coils and superconducting loop immersed therein to subject them to a temperature for field exclusion effect and supporting superconductivity therein;
(f) and a partially evacuated container enclosing the mass and said core and primary and secondary windings and isolating them from the helium.

References Cited

UNITED STATES PATENTS

| | | | |
|---|---|---|---|
| 2,907,211 | 10/1959 | Breazeale et al. | 73—382 |
| 2,942,479 | 6/1960 | Hollmann. | |
| 3,090,239 | 5/1963 | Dacus | 73—517 |
| 3,175,405 | 3/1965 | Doyle et al. | 73—517 |
| 3,212,341 | 10/1965 | Keller | 73—516 XR |
| 3,261,210 | 7/1966 | Buchhold | 73—517 |
| 3,272,016 | 9/1966 | Mullins | 73—517 |
| 3,060,750 | 10/1962 | Morgan | 73—517 |
| 3,209,601 | 10/1965 | Stiles | 73—517 |
| 3,221,563 | 12/1965 | Wing | 73—517 XR |
| 3,225,608 | 12/1965 | Simon. | |
| 3,238,788 | 3/1966 | Arthur et al. | 73—517 |

JAMES J. GILL, *Primary Examiner.*

U.S. Cl. X.R.

73—516